United States Patent [19]

De Fries et al.

[11] 3,709,035
[45] Jan. 9, 1973

[54] FLOW LEVEL SENSING SYSTEM WITH FLOW ELECTRICAL TRANSDUCER, AND ITS APPLICATION

[76] Inventors: Jan Richard Peter De Fries, Hirschwiesenstrasse 9, 8000 Zurich; Erwin Josef Tresch, Industriestrasse 20, 8117 Fallanden, both of Switzerland

[22] Filed: Dec. 15, 1970

[21] Appl. No.: 98,331

[30] Foreign Application Priority Data

Dec. 24, 1969 Switzerland..................19233/69

[52] U.S. Cl..................................73/204, 73/37.5
[51] Int. Cl..............................................G01f 1/00
[58] Field of Search............................73/204, 37.5

[56] References Cited

UNITED STATES PATENTS

| 1,218,205 | 3/1917 | Packard | 73/204 |
|---|---|---|---|
| 2,813,237 | 11/1957 | Fluegel et al. | 73/204 |
| 2,953,022 | 9/1960 | Laub | 73/204 |
| 3,347,088 | 10/1967 | Barnes | 73/37.5 |
| 3,374,673 | 3/1968 | Trageser | 73/204 |
| 3,482,433 | 12/1969 | Gladwyn | 73/37.5 |

Primary Examiner—Richard C. Queisser
Assistant Examiner—Herbert Goldstein
Attorney—Browdy & Neimark

[57] ABSTRACT

A flow rate sensing system with a flow-electrical transducer for the monitoring of the flow of a medium by at least one electrically heatable resistance wire which is incorporated directly into the thermoplastic flow channel wall, the resistance wire has areas of small and large diameters with the small diameter portion in the flow channel and the large diameter imbedded in the wall of the flow channel.

7 Claims, 6 Drawing Figures

A—A'

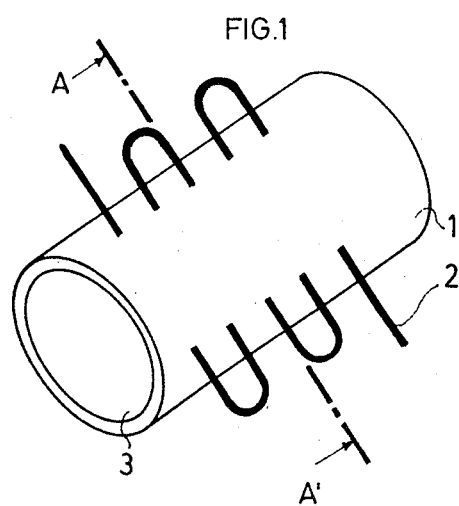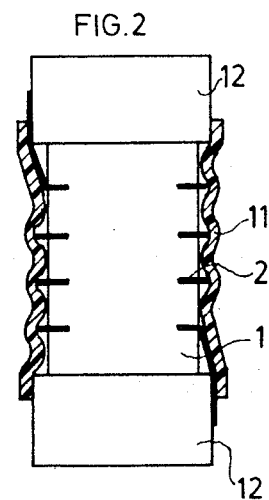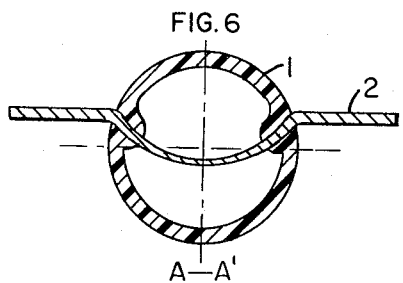

FLOW LEVEL SENSING SYSTEM WITH FLOW ELECTRICAL TRANSDUCER, AND ITS APPLICATION

The present invention concerns a flow rate sensing system with a flow-electrical transducer for the monitoring of the flow of a medium, and further concerns the application thereof.

Systems designed to measure the flow rate or the flow velocity of flowing media and convert the measured values into electrical signals are already known. Most of those systems involve complicated devices with bellows and moving plungers or diaphragms as well as electrical signal generators connected thereto. Being complicated, such systems are susceptible to trouble and also expensive to manufacture.

On the other hand, among the known systems are the hot-wire anemometers, designed to measure the velocity and direction of the air. They consist of a thin platinum wire stretched between the ends of a metal fork. The electric supply lines are connected to the fork and carried through the shank of the probe. When the thin wire is heated by an electric current, there is a relation between the velocity of a medium flowing past the wire and the amount of heat transferred from the wire to the medium. The relations between heating current, wire resistance and flow velocity form the basis for the working of the hot-wire anemometer. For the indication of the quantity measured, the usual practice is to use electric bridge circuits, based either on the principle of constant resistance of the probe or on the principle of constant current passing through the probe.

However, the wire systems soldered between forks are extremely sensitive to mechanical force.

To avoid those difficulties, the inventor has already proposed a flow-electrical transducer comprising a support which consists of a thermoplastic electrically insulating material and which is designed as a flow channel and is provided with at least one heatable wire. The heatable wire has different diameters, with the wire portions of small diameter functioning as sensors. The wall of the flow channel directly forms the mechanical support for the heatable wire, although the melting temperature of the thermoplastic material is below the maximum operating temperature of the wire. For better heat conduction and higher mechanical strength, the wire has a greater diameter at those points than it has inside the flow channel as seen in FIG. 6. The support may be provided with connections for the electric connection between the wire and an external circuit.

The object of the present invention is to provide a flow rate sensing system of the type mentioned at the beginning hereof which delivers electric signals and which is simple and cheap to manufacture and which can be combined with the measuring circuit evaluating the electric signals to form an easily accessible function block. The said object is achieved hereunder by providing a system wherein the flow channel of the transducer contains at least one electrically heatable resistance wire which is incorporated directly into the wall of the flow channel consisting of thermoplastic material, and wherein the resistance wire is connected to an electric circuit for the measuring of the heat transfer to the flowing medium and thus for the monitoring of the flow.

Such a system can be applied with special advantage for the sensing of punched recording media, such as punched tape or cards.

Several embodiments of the present invention are now to be described by way of example with reference to the accompanying drawings, in which FIG. 1 shows a flow-electrical transducer element;

FIG. 2 shows, partly in section, a complete transducer element with connection rings attached and with a shrink sleeve indicated in section;

FIG. 6 shows a cross-sectional view along line A—A' of FIG. 1.

Figure 3:
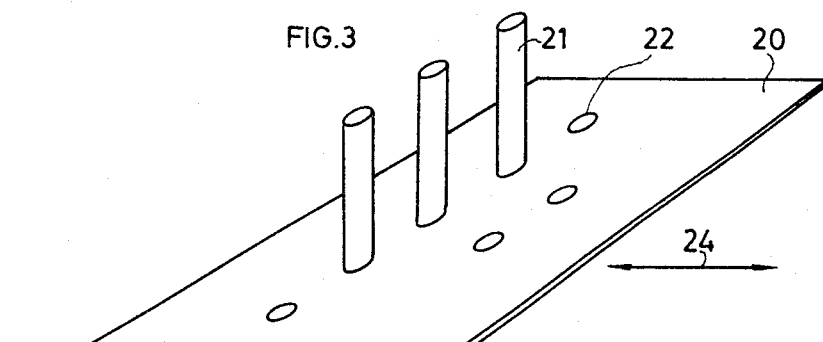
FIG. 3 shows a first embodiment, applicable as a punched tape reader.

The transducer element shown in FIG. 1 comprises a support 1 made of thermoplastic material, such as polyacetal, polyacryl, polyamide or a glass melting at low temperatures. The said support, which in the embodiment consists of a tube with a flow channel 3, holds a heatable wire 2 which in the embodiment consists of a silver-jacketed platinum wire. This wire is arranged perpendicular to the tube axis and, accordingly, within the zone of the flow channel 3, also perpendicular to the flow direction of a medium flowing through the said channel. In the embodiment shown, the heatable wire is laid in meander fashion in a plane parallel to the axis of the tube forming the flow channel. As may further be seen from FIG. 1, the said plane is eccentrically displaced with respect to the tube axis. The details of this arrangement will be discussed later.

The principle of flow measurement is based on the relation between the amount of heat transferred from the heated wire to a passing medium and the flow velocity of such medium. The heat transfer $Q'$ by time in kcal/mh per unit length of a thin heated wire of circular cross-section arranged perpendicular to the direction of flow velocity $v$ is:

(1) $Q' = \lambda (T - T_o) [1 + \sqrt{2\pi \rho d c_v v / \lambda}]$ where:
$\rho$ = density (kp/m$^3$) of flowing medium
$\lambda$ = heat transfer coeff. (kcal/sm) of flowing medium
$d$ = wire diameter (m)
$g$ = constant of gravitation (m/s$^2$)
$T$ = absolute temperature of wire
$T_o$ = absolute temperature of flowing medium
$c_v$ = specific heat of flowing medium (cal/g deg.)

When an electric current $I$ passes through the wire of resistance $R$, we find, with conditions otherwise stationary, $0.24\ I^2R = Q'$, where the factor 0.24 is the electrical heat equivalent. For constant values of $\rho$, $c_v$, $\lambda$ and $d$ is equation (1), we find:

(2) $I^2R = (T - T_o)(a \sqrt{v} + b)$

There, $a$ and $b$ are physical constants depending on the material used and can be easily determined empirically. It follows from equation (2) that when the resistance is kept constant the current $I$ is a function of flow velocity $v$, and when the current is kept constant the resistance $R$ is a function of flow velocity $v$. To measure those quantities, the general practice is to use known bridge circuits. And as such bridge circuits and similar measuring circuits are known, it is not necessary here to discuss the details thereof.

For the connection of the ends of the wire 2 to an external electric circuit, it is preferable to provide the support with connecting elements. If the support consists of a tube, such elements can consist of rings forced on to the tube ends. The rings are preferably made of gold or some other corrosion-proof metal of good conductivity. Instead, however, it is possible to weld the wire ends to certain points of the support so that those points can directly take over the function of connections for a circuit arrangement to be connected.

To reinforce the signal, with the channel dimensions given, the wire can be laid through the channel cross-section in several loops in series connection, as shown in FIG. 1, so that only the wire portions located in the channel and stripped of the jacketing are exposed to the flowing medium.

The method of incorporating the wire into the thermoplastic wall was found in thorough investigations on the stability of the transducer resistance over prolonged periods to ensure such exactly reproducible resistances that it is possible to dispense with the frequent recalibration of the measuring circuit required by known systems. Also, owing to the time stability of the resistance, it is possible in most industrial applications even to dispense with the bridge circuits otherwise required.

In a transducer element according to the preferred embodiment, with a channel diameter of 2.5 mm, a tube length of 20 mm, a platinum wire of 10 microns diameter and an internal resistance of 25 ohms and laid six-fold through the flow channel, the upper responding limit of the discriminator was 1.5 litre/minute for air as the medium.

For the measuring of greater quantities of medium, an arrangement having a slightly throttled main flow and having a transducer element located in a side arm produced far better results than if the element had been matched directly to the operating conditions in the main flow.

To protect the wire portions outside the flow channel, the transducer element can be provided with an external envelope. This is preferably achieved by fitting a shrink sleeve 11 consisting of polycarbonate or tetrafluoroethylene, for instance, as shown in FIG. 2. The elasticity of the shrink sleeve protects the entire surface of the transducer against undesirable external influences. It is of course possible instead to adopt other protecting means, such as varnishing.

Owing to the low thermal capacity of the extremely thin wire, it is possible with the transducer described to obtain a good resolution in time and, accordingly, a very rapid measuring sequence. With a preferred embodiment, as many as 500 measurings per second were attained.

Moreover, the transducer, which can be regarded as a passive electrical element, delivers a strong and readily processable signal. Consequently, electric discriminator circuits connected to the transducer can have a simple and low-cost design.

The arrangement described can be easily incorporated into integrated circuits, as the thermoplastic support can be designed for fitting into a printed circuit.

The following now describes a preferred embodiment of a digital flow rate sensing system suitable for the sensing of a binary information medium such as punched tape. As shown in FIG. 3, a printed circuit 20 comprises several flow-electrical transducers 21 whose supports consist of small tubes. The axes of the tubes are perpendicular to the plane of the printed circuit. The latter is provided with holes 22 at least at the points where the transducers 21 are fitted. The transducers 21 are either fitted directly into the holes 22 or are connected to the printed circuit 20 by additional fastening means. Such fastening means may consist in thermoplastic deformation of the tube material or may consist of additional devices. The ends of the wires incorporated into the tubes are connected to leads arranged on the underside of the printed circuit 20, for instance. The arrangement described is connected to an electrical measuring circuit, not shown, by means of contacts 23.

It is of course possible to accommodate additional switch elements in the printed circuit 20, resulting in a more compact construction of the system. Further, the contacts 23 may consist of a contact strip added to the printed circuit 20 or may consist of contact tongues fitted directly to the printed circuit as leads.

If the system described is to be used as a punched-tape reader, for instance, a guide table, not shown, is arranged underneath the arrangement shown in FIG. 3 and parallel to the printed circuit 20. The punched tape to be read is then arranged between the guide table and the printed circuit 20. If the tape is to move in the direction indicated by the arrow 24 in FIG. 3, the holes 22 and, accordingly, the transducers 21 are preferably spaced from each other at a distance perpendicular to the arrow 24 which corresponds to the channel spacing on the tape to be read. The holes 22, or the transducers 21, need not necessarily be arranged in a single row perpendicular to the arrow 24. According to the space available, they may instead be distributed over several rows.

The flow channels of the transducers 21 are connected to a flow source or a flow depression, so that, in the absence of a punched tape, a uniform flow is ensured within the transducer elements. Thus, the flow source may consist of a small fan from which a common flow channel is laid to the apertures of the transducers 21. Owing to the high responsivity of the transducers 21, previously mentioned, it is sufficient for this purpose to use a small cooling fan of the ordinary type.

When the punched tape, not shown in FIG. 3, is introduced, it closes the flow channels of the transducers 21, unless a hole representing a storage location is provided in the particular channel. Where there is such a hole, the transducer 21 associated with that channel suddenly receives a brief flow, which is sensed by the electrical circuit registering the change in the wire resistance.

Owing to the previously mentioned low thermal capacity of the wires, such an arrangement can read punched tape with a frequency of about 1,000 characters per second.

Figure 4:
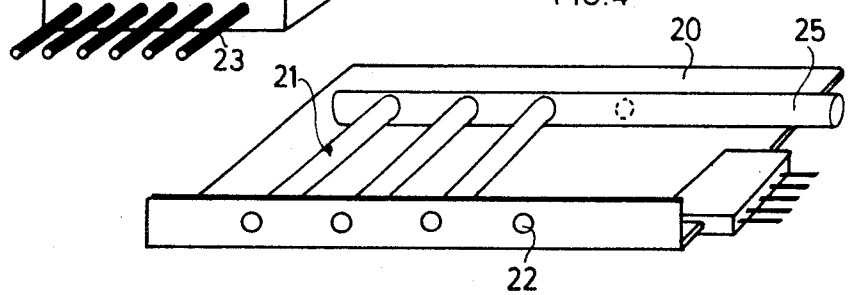
FIG. 4 shows a second embodiment, also applicable as a punched-tape reader.

FIG. 4 shows another embodiment, in which the transducers 21 are arranged parallel to the plane of the printed circuit 20 with respect to the tube axis. The action of this arrangement resembles that of the arrangement shown in FIG. 3, with the difference that the wire ends can be arranged on opposite sides of the tubes. Moreover, it is possible here with advantage to lay a common flow channel 25 near the contacts 23, so that the inserting of the card into a corresponding holding device establishes both the electrical and the flow connections.

An advantage of the described arrangement over known punched-tape readers is that the tape itself is not subjected to mechanical force, and that, owing to the high responsivity of the transducer cells, the shape of the holes in the recording medium does not affect the measuring result, and that any foreign matter on the tape is easily removed by the flowing medium, as by the air in the preferred embodiment. Moreover, any optical transparency changes in the tape such as constitute a frequent source of error in the optical reading of punched tape have no effect on the reading result. It is even possible to use tape portions stuck one over the other without influencing the reading result.

Owing to the principle of flow rate measurement by the flow-electrical transducers proposed, with the cross-section of the flow channel known, the reading result is not affected by any pressure variations within the flowing medium used for sensing. The arrangement described therefore also permits a very high signal-to-noise ratio to be obtained. For faultless discrimination in the digital application, a minimum pressure of 10 to 12 mm water gauge is already sufficient.

For completeness, it might be added that the arrangement described can read not only punched tape but also any other type of punched binary information recording medium, such as punched cards.

Figure 5:
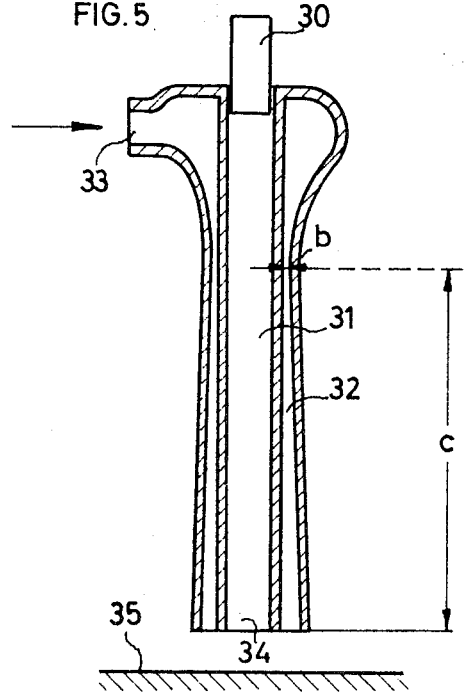
FIG. 5 shows yet another embodiment, applicable as a probe for digital distance measurement.

Yet another embodiment comprises the flow rate sensing system combined with a device, shown in FIG. 5, for distance monitoring. This arrangement can be used with special advantage as a limit switch such as is used in machine tool control.

As shown in FIG. 5, a transducer element 30 is connected to a sensor. This sensor contains a first central flow channel 31 as the continuation of the flow channel associated with the transducer cell 30. A second coaxial flow channel 32 communicates through an aperture 33 with a flow source or a flow depression. On the opposite side of the sensor, the two channels pass into an aperture 34.

The second flow channel 32 presents a widening cross-section, with the narrowest point near the transducer 30 and the widest point near the aperture 34. If the channel width at the narrowest point is $b$, the optimum distance $c$ of the widest point at the aperture of the flow channel from the said narrowest point is approximately $40 b$.

If the wall of an object 35 to be sensed is at a sufficient distance from the sensing aperture 34 and if the aperture 33 is connected to a flow source, a flow, induced by the flow between aperture 33 and sensing aperture 34, will arise in the first flow channel, and the direction of such flow will be parallel to that in the second flow channel. Now, if the wall of the object 35 keeps approaching the sensing aperture 34 of the sensor, the flow in the first channel 31 will suddenly change direction. This effect can be registered and discriminated by means of the transducer cell 30 connected to the first flow channel. It is thus possible, for instance, to register the zero point of the flow rate measured by the transducer cell. Moreover, additional logic circuits can be connected.

It is thus possible to perform very accurate distance settings or workpiece sensings without any touch contact.

We claim:

1. Flow rate sensing system comprising a flow channel formed of thermoplastic material; at least one electrically heatable resistance wire within said flow channel, said wire having areas with small and large diameters, with the small diameter portion of the wire being arranged completely inside said flow channel, thereby acting as a sensor area, and with the large diameter portion of the wire being imbedded in and supported by the wall of said flow channel, the operating temperature of the heatable wire being above the melting temperature of said thermoplastic material; and circuit means connected to said resistance wire for electrically distinguishing between different resistance rates corresponding to different flow rates.

2. An apparatus in accordance with claim 1 for reading binary information stored on an information medium further including means for feeding a storage location of a binary information storage medium past said flow channel whereby the flow-rate within said flow channel changes as a function of the binary information stored on the information medium.

3. An apparatus according to claim 2 for reading a multi-channel information medium, such as a punched card or a punched tape, further including an integrated circuit board carrying several flow rate sensing systems in a parallel configuration, each said system being positioned over one track on the information medium and said circuit means being located on said integrated circuit board.

4. An apparatus according to claim 3, wherein said integrated circuit board includes a multi-purpose connector means for electrically connecting said integrated circuit board to other circuits and for connecting said flow channels with a source of flow medium.

5. An apparatus according to claim 3, wherein said flow channels are arranged within one plane which is parallel to the plane of said integrated circuit board.

6. An apparatus for indicating the proximity of an object comprising the system of claim 1, an outer flow channel which coaxially surrounds the flow channel of said system, said outer channel and said channel having concentric orifices, flow source means for causing a flow medium to pass through said outer channel producing a flow from said orifice towards the object whereby the flow level through said flow channel is varied by the space between the object and the orifice, which variation is sensed by said electrically heatable resistance wire arranged within said flow channel.

7. Apparatus according to claim 6, wherein the outer flow channel has a small cross-section near said flow source means, which cross-section widens toward said nozzle-like orifice.

* * * * *